United States Patent

[11] 3,555,343

[72] Inventor John K. Allen
Indianapolis, Ind.
[21] Appl. No. 712,017
[22] Filed Mar. 11, 1968
[45] Patented Jan. 12, 1971
[73] Assignee RCA Corporation
a corporation of Delaware

[54] AUTOMATIC DEGAUSSING CIRCUIT FOR TV HAVING HALF-WAVE VOLTAGE DOUBLER POWER SUPPLY
3 Claims, 2 Drawing Figs.

[52] U.S. Cl. ........ 315/8, 317/157.5
[51] Int. Cl. ........ H01f 13/00, H01f 29/98
[50] Field of Search ........ 315/8; 338/22, 23, 24; 178/5.4RC

[56] References Cited

UNITED STATES PATENTS

| | | | |
|---|---|---|---|
| 3,286,122 | 11/1966 | Dietch | 315/8 |
| 3,317,781 | 5/1967 | Barbin et al. | 315/8 |
| 3,324,344 | 6/1967 | Norley | 315/8 |

OTHER REFERENCES

RCA Color Television Service Data, File: 1961 #T6; CTC 11C chassis; page 45 cited(178- 5.4RC)

*Primary Examiner*—Robert Segal
*Attorney*—Eugene M. Whitacre

ABSTRACT: Automatic degaussing circuit for a color television receiver employing a half-wave voltage doubler type power supply. The series capacitance of a cascaded voltage doubler power supply is provided by a pair of capacitors in parallel current paths. A thermistor, connected in series with the capacitor of one current path, is shunted by the series combination of VDR and a degaussing coil. A second thermistor is connected in series with the capacitor of the remaining current path. Initially upon turn-on of the cold receiver, the major portion of capacitor charging current passes through the then low impedance VDR-coil path and the capacitor in series therewith, the value of this capacitor being chosen to ensure substantially symmetrical AC energization. Subsequently, after thermistor warmup, current flow is equally divided between the parallel capacitances, and the voltage doubler operates efficiently with an augmented value of series capacitance corresponding to sum of the parallel capacitances.

Figure 1:
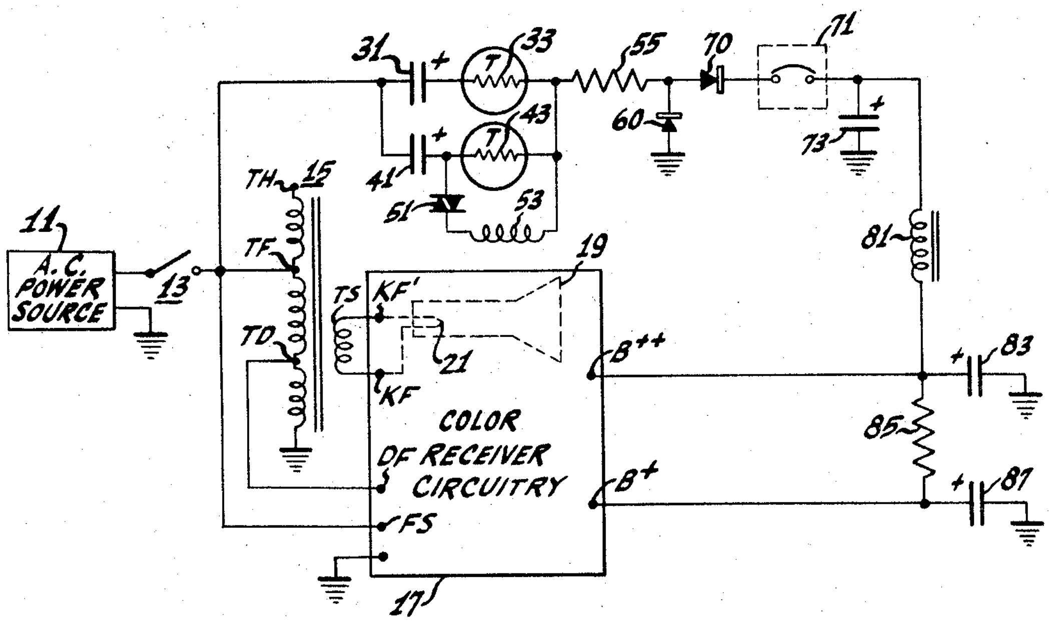

Inventor:
JOHN K. ALLEN
BY William H. Meagher
Attorney

AUTOMATIC DEGAUSSING CIRCUIT FOR TV HAVING HALF-WAVE VOLTAGE DOUBLER POWER SUPPLY

This invention relates generally to automatic degaussing circuits for color television receivers, and, particularly to forms of such circuits which are advantageous for use in color television receivers of the type employing half-wave voltage doubler type low voltage power supplies.

Undesired magnetizations of the metal shadow mask of a color kinescope, associated supporting structure and other metal structures of a color television receiver, may occur during shipment and during use, due to various extraneous fields associated with trucks, elevators, motors and other flux sources, including the earth's magnetic field. Since distortion of the color image reproduced by the kinescope may result from such undesired magnetizations, it has been recognized as desirable to incorporate degaussing apparatus in the receiver to facilitate elimination of the undesired magnetizations.

One approach to this receiver degaussing function that has found wide acceptance automatically provides a degaussing action upon each turn-on of the (cold) receiver. In accordance with this approach, a degaussing coil structure, suitably disposed about the color kinescope, is connected for energization by the alternating current input to the receiver's low voltage power supply. Upon turn-on of the receiver, there is initially a large surge of current charging the power supply storage capacitors; the magnitude of the alternating current rapidly diminishes as the capacitor charge builds up. Such AC energization—initially large, but rapidly diminishing in amplitude—is the form of energization desired for demagnetization purposes.

A degaussing circuit of the type described above further requires apparatus for effectively switching the degaussing coil structure out of circuit during normal operation of the receiver; this is particularly necessary since charging current is continually flowing to replenish charge because of the loading on the power supply. One particularly effective switching arrangement, which switches the coil out of circuit in a graduated manner (tapering down the coil current to an insignificant amplitude within a second or so after turn-on), involves the use of a thermistor and a VDR (voltage dependent resistor), with the thermistor inserted as a series element in the path of power supply capacitor charging current, and with the series combination of VDR and degaussing coil shunted across the thermistor. In operation, when the set is cold at turn-on, the value of resistance presented by the cold thermistor is sufficiently large to develop an appreciable AC voltage thereacross; at such a voltage level, the effective resistance value of the VDR is relatively small, and the VDR-coil series combination presents a relatively low impedance across a relatively large AC voltage source, whereby a significant portion of the charging current is permitted to flow in the degaussing coil structure. However, subsequently, after sufficient time to heat up the thermistor, the latter assumes its "hot" value of relatively low resistance, whereby a relatively low AC voltage appears thereacross; at low values of source voltage, the resistance value of the VDR is relatively large, whereby the VDR-coil series combination appears as a high impedance across a small voltage source, resulting in insignificant coil current.

An example of use of the the above-described degaussing arrangement is provided by the RCA CTC 27 color television receiver chassis, which is the subject of the RCA Service Data Pamphlet, designated 1967 No. T15. It may be noted that in the CTC 27 chassis, the low voltage power supply for the receiver is of a well-known full-wave rectifier form, with a power transformer providing a push-pull AC input thereto.

In receiver construction, it is often desired, in the interest of conservation of weight, volume and/or expense, to avoid the use of the conventionally bulky, heavy and relatively expensive low voltage power transformer; elimination of the transformer is particularly desirable when considering portability of the receiver. An example of color television receiver construction which avoids the use of the conventional low power transformer is the RCA CTC 22 color television receiver chassis, the subject of an RCA Service Data Pamphlet designated 1967 No. T11. In the CTC 22 chassis the low voltage power supply takes a cascaded voltage doubler form; in such a circuit arrangement, one side of the AC power supply is grounded, while the remaining, "hot" side is connected to one terminal of a storage capacitor, with a first diode connected between the opposite terminal of the first storage capacitor and ground, and with a second, oppositely poled diode also connected to the opposite terminal of the first storage capacitor and returned to ground via a second storage capacitor. During given half cycles of the AC input wave, the first diode conducts to charge the first storage capacitor; during the remaining half cycles of the AC input wave, the second diode conducts charging the second storage capacitor to a substantially doubled voltage value (the charge on the first storage capacitor adding to the AC input).

The economics of design for voltage doubler supplies of the above-described type generally did dictate a larger value for the first storage capacitor relative to the second storage capacitor. A given reduction in value of the second storage capacitor, with concomitant reduction in size and cost, has less effect on doubler efficiency and resultant B+ output than a comparable reduction in the value of the first storage capacitor. This follows from the presence of the first storage capacitor in the charging circuits for both half cycles of the AC input wave. Accordingly, prudent design results in dissimilar values for the respective storage capacitors.

A problem arises when one attempts to employ the storage capacitor charging current of a voltage doubler power supply as just described for automatic degaussing purposes, the problem being the asymmetry of charging current magnitude for successive half cycles of the AC input wave. Should such an asymmetrical charging current be employed for degaussing coil energization, an undesirable spot shift effect is introduced during the degaussing coil energization because of the presence of what is effectively a DC component of energization.

One approach to avoidance of the undesired spot shift would be to alter the design of the voltage doubler supply to eliminate the dissimilarity of charging current magnitudes for successive half cycles, either by (*a*) lowering the value of the first storage capacitor, or (*b*) raising the value of the second storage capacitor. However, the first named design alteration would result in undesired reduction in doubler efficiency and resultant B+ level, while the second named design alteration would introduce a wasteful increase in capacitor size and cost from the point of view of power supply design economics.

The present invention is directed to degaussing circuit arrangements wherein the charging current approach to degaussing may be employed in connection with an efficiently designed voltage doubler supply, without introducing any significant asymmetry in the AC energization of the degaussing coil, i.e., without introducing undesired spot shifts.

In accordance with the principles of the present invention, such a combination of desirable power supply and degaussing operation is realized through the use of parallel storage capacitors as the series capacitance element (i.e., as the "-first" storage capacitor) of the voltage doubler supply, and associate associating the degaussing coil and its accompanying switching arrangement with the current passing through but one of the parallel capacitors. The parallel capacitance values may be chosen so that the net series capacitance provided conforms to efficient voltage doubler supply design requirements, while the charging current portion serving to energize the degaussing coil is sufficiently symmetrical for successive half cycles as to avoid significant spot shift distortions.

In accordance with a particular embodiment of the present invention, a thermistor is connected in series with one of the above mentioned parallel capacitors, and the series combination of a VDR and the degaussing coil is shunted across the thermistor. A second thermistor (with characteristics comparable to the first) is connected in series with the remaining one of the parallel capacitors. While the first and second thermistors may be separate elements, assurance of proper tracking may be especially realized by incorporation of both thermistors in a single device providing a common thermal environment.

Upon turn-on of the cold receiver, the impedance of the VDR-coil path is low relative to the impedance of the cold thermistor across which it is shunted, and a major portion of the charging current passed by the associated capacitor is diverted through the coil. Moreover, the impedance of the VDR-coil path is low compared with the impedance presented (by the additional cold thermistor) in series with the capacitor of the parallel path. Thus, under these conditions, the capacitor associated with the degaussing coil is primarily determinative of the series capacitance of the doubler; its value may be chosen to ensure substantially symmetrical AC energization of the degaussing coil. Subsequently, when the thermistors reach their hot value, and the degaussing coil is effectively switched out of circuit, equally low impedances are presented in series with the capacitors of each parallel path. Under these conditions, the series capacitance of the voltage doubler has an increased value corresponding to the sum of the individual capacitances; efficient voltage doubler action ensues, but with its accompanying asymmetry of positive and negative current pulses introducing no disturbance to the completed degaussing action.

The primary object of the present invention is to provide novel and improved automatic circuit degaussing for a color television receiver.

An additional object of the present invention is to provide an economical and efficient combination of automatic degaussing circuitry with a low voltage power supply of a voltage doubler type, for use in a color television receiver.

Figure 2:
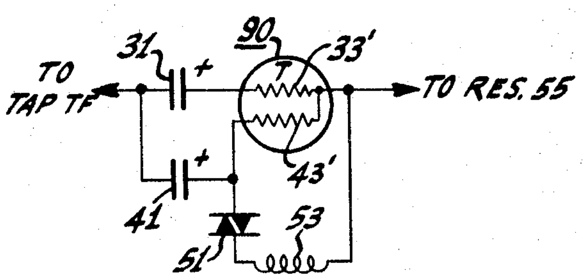

Other objects and advantages of the present invention will be readily recognized by those skilled in the art upon a reading of the following detailed description, and an inspection of the accompanying drawing in which:

FIG. 1 illustrates, with combined schematic and block representations, a color television receiver employing automatic degaussing circuitry in accordance with an embodiment of the present invention; and FIG. 2 illustrates a modification of the invention embodiment of FIG. 1.

In FIG. 1, major segments of the circuitry of a color receiver are illustrated only by block representation, with the details of the receiver's power supply and degaussing circuitry shown schematically. An AC power source 11, which may comprise suitable apparatus for coupling to an AC power line, has a pair of output terminals, one connected to chassis ground and the other connected via the receiver's on-off switch 13 to a tap TF on a filament transformer 15. Tap TF and chassis ground effectively constitute a pair of power input terminals for the receiver, across which terminals an alternating voltage is supplied when the receiver is placed in operation by the closing of switch 13.

The filament transformer 15 includes a primary winding extending between tap TF and chassis ground, and a secondary winding TS, which is utilized to derive a reduced amplitude filament voltage for the filament 21 of the receiver's color kinescope 19 (shown in dotted outline only). Coupling from the secondary winding TS to the filament 21 is effected via kinescope filament voltage input terminals KF and KF'.

An intermediate tap TD on the primary winding of transformer 15 permits derivation of a stepped-down filament voltage for use by the damper tube of the receiver's horizontal deflection circuits; for this purpose, tap TD is connected to the damper filament voltage input terminal DF of the receiver circuitry 17. The remaining tube filaments are disposed in a suitable series string, connected between a filament string voltage input terminal FS and chassis ground; voltage for the series string is supplied by a direct connection from terminal FS to the transformer tap TF. A continuation of the primary winding beyond tap TF to an end terminal TH is also provided, with no external connection to the end terminal TH being made in normal operation of the receiver; however, the winding continuation permits, under conditions of high line voltage operation, the use of an augmented primary winding for the filament transformer, whereby proper filament voltages for the kinescope and deflection circuits; for this purpose, tap TD is connected to the damper filament voltage input terminal DF of the receiver circuitry 17. The remaining tube filaments are disposed in a suitable seriestring, connected between a filament string voltage input terminal FS and chassis ground; voltage for the series string is supplied by a direct connection from terminal FS to the tarnsformer tap TF. A continuation of the primary winding beyond tap TF to an end terminal the is also provided, with no external connection to the end terminal the being made in normla operation of the receiver; however, the winding continuation permits, under conditions of high line voltage operation, the use of an augmented primary winding for the filament transformer, whereby proper filament voltages for the kinescope and damper may be obtained despite the high line voltage conditions. Under such high line voltage conditions, the illustrated circuit may be altered to remove the connection from the output terminal of switch 13 to the tap TF, and to provide, in its place, a direct connection from the output terminal of switch 13 to the end terminal TH.

The output terminal of switch 13 (i.e., tap TF, for the illustrated circuit connections) serves as the input terminal for a voltage doubler type of low voltage power supply. The voltage doubler employs a pair of diodes 60 and 70 as rectifying devices. The series combination of diode 70, a circuit breaker 71 and a storage capacitor 73 is shunted across the diode 60, with the cathode of diode 60 directly connected to the anode of diode 70; the anode of diode 60 is directly connected to chassis ground, while the cathode of diode 70 is returned to chassis ground via the circuit breaker 71 and storage capacitor 73. It will be noted that, by virtue of these connections, the diodes are oppositely poled with respect to alternating current coupled from tap TF to their junction.

The network which couples alternating current from tap TF to the junction of the diodes is of particular interest with respect to the operation of the present invention. This coupling network includes a current limiting resistor 55 in series with a pair of parallel current paths. One of these parallel current paths includes a storage capacitor 31 in series with a thermistor 33; the other of these parallel current paths includes a storage capacitor 41 in series with a parallel combination formed by a thermistor 43, shunted by a VDR 51 serially connected with a degaussing coil 53. It will be understood that the degaussing coil 53 structure is suitably disposed with respect to the color kinescope 19 so as to effect the desired demagnetization of kinescope 19 and associated elements (e.g., disposed in the physical arrangement used in the aforementioned CTC 27 receiver).

The remaining elements of the illustrated power supply include the series combination of a filter choke 81 and a filter capacitor 83, shunted across the storage capacitor 73, and the series combination of a dropping resistor 85 and an additional filter capacitor 87, shunted across the filter capacitor 83. A filtered DC voltage, of a level approaching twice the peak amplitude of the alternating voltage at tap TF, appears at the junction of choke 81 and filter capacitor 83 is supplied as a unidirectional operating potential to the B++ terminal of the receiver circuitry 17. An additional filtered DC voltage of suitably lessened amplitude appears at the junction of resistor 85 and filter capacitor 87, and is supplied as an additional unidirectional operating potential to the B+ terminal of receiver circuitry 17.

In operation of the voltage doubler, diode 60 conducts during those half cycles of the AC input wave when tap TF swings negative relative to chassis ground, while diode 70 conducts during the alternate half cycles of the AC input wave when tap TF swings positive relative to chassis ground. During the half cycles of diode 60 conduction, the current passes via both of the storage capacitors 31 and 41, and both are charged with the polarity indicated on the drawing (i.e., the plates remote from tap TF are charged positively). During the half cycles of diode 70 conduction, the input swing appears superimposed in aiding relationship with the charge on capacitors 31 and 41. During these periods, the stored charge on capacitors 31 and 41 is effectively transferred to capacitor 73, with the input swing further charging the capacitor 73 to a substantially doubled level.

Under normal operating conditions (i.e., after thermistor warmup), the effective series capacitance presented in the voltage doubler circuit by the coupling network interposed between tap TF and the diode junction is equivalent to the sum of the capacitances of the respective storage capacitors 31 and 41. In accordance with appropriate design principles for the voltage doubler this series capacitance value is desirably larger than the capacitance value of the shunt capacitor 73. Illustrative of a desirable ratio are values of 300 microfarads for the series capacitance and 200 microfarads for the shunt capacitance.

Under the illustrative conditions of dissimilarity between series and shunt capacitances values, the current pulses passed by diode 60 will exceed in magnitude the current pulses passed by diode 70 by a substantial magnitude. If current pulses so dissimilar in magnitude were passed through the degaussing coil 53, the asymmetry of AC energization would be such as to result in the passage of what is effectively a DC component, of sufficient magnitude to introduce an undesired spot shift.

However, in operation of the illustrated circuit, the current conditions that prevail after thermistor warmup are not the same as those that occur immediately after turn-on of the cold receiver, i.e., that occur during the time period when degaussing is effected. At turn-on, thermistor 43 has its higher cold value, and the VDR-coil path in shunt with it is significantly lower in impedance value. This impedance value of the VDR-coil path is also significantly lower than the impedance of the cold thermistor 33. Consequently, during the initial cycles of the input wave after turn-on, the majority of charging current is flowing through capacitor 41 in series with VDR 51 and coil 53 (i.e., with capacitor 31 substantially out of circuit due to the relatively high impedance in series with it).

Under the foregoing circumstances, the series capacitance of the voltage doubler is primary determined by the capacitance of the value of capacitor 41 alone. The value of capacitor 41 may be chosen to ensure substantially symmetrical AC energization of the degaussing coil (illustratively, the net series capacitance referred to above may be divided equally between capacitors 31 and 41, with a resultant value of 150 microfarads for capacitor 41). Subsequently, after effective completion of the degaussing action, and upon warmup of thermistors 33 and 43, the resistance values of thermistors 33 and 43 drop substantially and the impedance of the VDR-coil path rises. Equally low impedance values (primarily determined by the hot thermistors) appear in series with both of the capacitors 31 and 41 and current divides substantially equally between them. Capacitor 31 is no longer effectively out of circuit, and the series capacitance of the voltage doubler now is a higher value corresponding to the sum of the capacitance values of capacitors 31 and 41, as desired for efficient voltage doubler action. The diode currents are now asymmetrical but the asynmmetry is not disturbing, since degaussing action is completed and the degaussing coil 53 is effectively out of circuit.

In the illustrated arrangement of FIG. 1, separate thermistor devices 33 and 43 have been shown for use in association with respective capacitors 31 and 41. In such an arrangement, care should be exercised to equalize thermal conditions for the devices so as to maintain proper tracking of their value changes. FIG. 2 illustrates a modification of FIG. 1 which may be employed to maximize assurance of matching of thermal conditions. In the FIG. 2 arrangement, a single, three-thermal thermistor device 90 is employed in place of the separate thermistors 33 and 43 of FIG. 1. The general circuit arrangement remains unchanged with the thermistor element 33' of the device 90 connected between storage capacitor 31 and current limiting resistor 55, and with thermistor element 43' of device 90 connected between storage capacitor 41 and capacitor 55; the series combination of VDR 51 and degaussing coil 53 is appropriately shunted across the thermistor element 43' of device 90. The device 90 provides a common thermal environment for the thermistor elements 33' and 43'.

The table below sets forth circuit parameter values for the arrangement of FIG. 1 which have proved satisfactory in operation; it will be appreciated that they are presented by way of example only.

Capacitor 31: 150 microfarads.
Capacitor 41: 150 microfarads.
Capacitor 73: 200 microfarads.
Capacitor 83: 150 microfarads.
Capacitor 87: 100 microfarads.
Resistor 55: 2 ohms.
Resistor 85: 3600 ohms.
Thermistors 33, 43: 1.8 ohms, hot; 120 ohms, cold.
VDR 51: 300 ohms at 20 volts; 1,200 ohms at 8 volts
Diodes 60, 70: 1N3195.
Coil 53: 100 turns, No. 27 AWG copper; 24 ohms resistance.
Coil 81: 0.5 henry.
B++: 280 volts.
B+: 140 volts.

While the invention has been described in terms of a particular preferred embodiment, modifications within the scope of the invention may be made. For example, capacitors 31 and 41 may be unequal in value.

I claim:

1. In a color television receiver adapted to receive energy from a pair of alternating voltage line input terminals, the combination comprising:

a transformerless voltage doubler type B+ supply including:
- a pair of diodes, each having a pair of electrodes;
- an alternating current coupling network linking dissimilar electrodes of said pair of diodes to one of said input terminals;
- a first capacitor coupled between the remaining electrode of one of said diodes and the remaining electrode of the other of said diodes;
- means for connecting said remaining electrode of said one diode to the other of said input terminals;

and wherein said alternating current coupling network includes:
- a second capacitor and a first thermistor connected in series between said one input terminal and said dissimilar electrodes;
- a third capacitor and a second thermistor connected in series across the series combination of said second capacitor and first thermistor;
- a voltage dependent resistor and a degaussing coil connected in series across said second thermistor;
- said first and second thermistors having negative temperature coefficients and substantially matched thermal characteristics; and
- the sum of the capacitance values for said second and third capacitors exceeding the capacitance value of said first capacitor.

2. In a color television receiver including a color kinescope subject to undesired magnetizations, a degaussing coil structure for eliminating said undesired magnetizations when suitably energized with alternating current of an initially large magnitude which subsequently diminishes in a smoothly tapering manner to an insignificant magnitude; receiver circuitry requiring an operating potential of a unidirectional character; a pair of power input terminals; and power coupling apparatus adapted, when the receiver is placed in operation, to supply an alternating voltage input across said input terminals, the alternating voltage having a peak amplitude smaller than the amplitude of the unidirectional operating potential required by said receiver circuitry; apparatus for developing said unidirectional potential and for providing said suitable energization of said degaussing coil structure, comprising the combination of:

an alternating current coupling network including a first storage capacitor;

a first diode connected in series with said alternating current coupling network across said power input terminals;

a second diode;

a second storage capacitor;

means for serially connecting said second diode and said second storage capacitor, in the order named, across said first diode in such manner said first and second diodes are oppositely poled with respect to alternating current coupled by said network, said unidirectional operating potential required by said receiver circuitry being derived from the potential appearing across said second storage capacitor;

said alternating current coupling network presenting a first alternating current path between one of said input terminals and said first diode which includes said first storage capacitor in series with the parallel combination of first and second current conveying circuit branches, said first current conveying circuit branch including a voltage dependent resistor in series with said degaussing coil structure, said second current conveying circuit branch including a first thermistor having a negative temperature coefficient, said first thermistor cooperating with said voltage dependent resistor to control the division of current between said first and second current conveying circuit branches so that initially, upon placing of said receiver in operation, a substantial portion of the current passed by said first storage capacitor flows in said first current conveying circuit branch including said degaussing coil structure, and subsequently a substantial portion of the current passed by said first storage capacitor is bypassed around said degaussing coil structure via said second current conveying circuit branch including said first thermistor;

a third storage capacitor;

said alternating current coupling network additionally presenting a second alternating current path in parallel with said first alternating current path between said one input terminal and said first diode which includes said third storage capacitor; and current controlling means, comprising a second thermistor having a negative temperature coefficient disposed in series with said third capacitor in said second alternating current path, for initially, upon placing of said receiver in operation, precluding substantial current flow in said second path and subsequently permitting substantial current flow in said second path.

3. Apparatus in accordance with claim 2 wherein said first and second thermistors have substantially matched characteristics and are provided with a common thermal environment.

UNITED STATES PATENT OFFICE

CERTIFICATE OF CORRECTION

Patent No. 3,555,343 Dated 1-12-71

Inventor(s) John K. Allen

It is certified that error appears in the above-identified patent and that said Letters Patent are hereby corrected as shown below:

Column 4 line 5 cancel beginning with "the kinescope and" to and including "voltages for" in column 4 line 19.

Signed and sealed this 3rd day of August 1971.

(SEAL)
Attest:

EDWARD M.FLETCHER,JR.
Attesting Officer

WILLIAM E. SCHUYLER, JR.
Commissioner of Patents